United States Patent
Tahara

(10) Patent No.: US 9,714,643 B2
(45) Date of Patent: Jul. 25, 2017

(54) BOILING-WATER GEOTHERMAL HEAT EXCHANGER AND BOILING-WATER GEOTHERMAL POWER GENERATION EQUIPMENT

(71) Applicant: EST. Inc., Fukuoka-shi, Fukuoka (JP)

(72) Inventor: Shunichi Tahara, Fukuoka (JP)

(73) Assignee: EST. Inc., Fukuoka-shi (JP)

( * ) Notice: Subject to any disclaimer, the term of this patent is extended or adjusted under 35 U.S.C. 154(b) by 172 days.

(21) Appl. No.: 14/785,336

(22) PCT Filed: Apr. 9, 2015

(86) PCT No.: PCT/JP2015/061172
§ 371 (c)(1),
(2) Date: Oct. 17, 2015

(87) PCT Pub. No.: WO2015/186431
PCT Pub. Date: Dec. 10, 2015

(65) Prior Publication Data
US 2016/0169211 A1    Jun. 16, 2016

(30) Foreign Application Priority Data

Jun. 5, 2014  (JP) ................. 2014-117043
Oct. 1, 2014  (JP) ................. 2014-202713

(51) Int. Cl.
*F03G 7/04*        (2006.01)
*F24J 3/08*        (2006.01)
(Continued)

(52) U.S. Cl.
CPC .............. *F03G 7/04* (2013.01); *F01K 25/10* (2013.01); *F01K 27/02* (2013.01); *F24J 3/081* (2013.01);
(Continued)

(58) Field of Classification Search
CPC .... F03G 7/04; F24J 3/084; F24J 3/081; F28D 7/12; F01K 25/10; F01K 27/02; Y02E 10/12
(Continued)

(56) References Cited

U.S. PATENT DOCUMENTS 3,757,516 A * 9/1973 McCabe ................. F01K 7/00
                                                                 165/45
4,142,108 A   2/1979 Matthews
(Continued)

FOREIGN PATENT DOCUMENTS

JP    S49-103122 A    9/1974
JP    S52-122745 A    10/1977
(Continued)

*Primary Examiner* — Hoang Nguyen

(57) ABSTRACT

The boiling-water geothermal heat exchanger 1 is provided with a water injection pipe 2 which is installed underground and to which water is supplied from the ground and a steam extraction pipe 3 which is installed underground so as to be in contact with the water injection pipe 2 and has a plurality of ejection ports 5, in which a pressure inside the steam extraction pipe 3 is reduced to the vicinity of a pressure required by a turbine 6, high-pressure hot water which is produced by supplying heat from a geothermal region 4 to water inside the water injection pipe 2 is changed to a single-phase flow of steam inside the steam extraction pipe 3 present underground via the ejection ports 5, and the single-phase flow of steam is extracted on the ground. And in the boiling-water geothermal heat exchanger 1, a heat insulation portion is formed at a part which is in contact with a low-temperature region close to the ground surface, and the heat insulation portion is such that the level of water supplied to the water injection pipe 2 is lowered to form an air layer at an upper part of the water injection pipe 2.

7 Claims, 9 Drawing Sheets

(51) Int. Cl.
  *F01K 25/10* (2006.01)
  *F01K 27/02* (2006.01)
  *F28D 7/12* (2006.01)

(52) U.S. Cl.
  CPC ............... *F24J 3/084* (2013.01); *F28D 7/12* (2013.01); *Y02E 10/12* (2013.01)

(58) Field of Classification Search
  USPC ............................................. 60/641.2–641.4
  See application file for complete search history.

(56) References Cited

U.S. PATENT DOCUMENTS

| | | | | |
|---|---|---|---|---|
| 4,228,657 | A | * | 10/1980 | Leo ........................ F01K 7/00 418/83 |
| 7,849,690 | B1 | | 12/2010 | Lakic |
| 2004/0035110 | A1 | | 2/2004 | Hildebrand |
| 2004/0244990 | A1 | * | 12/2004 | Herr ........................ E21B 43/16 166/370 |
| 2011/0167819 | A1 | * | 7/2011 | Lakic ................... H02K 7/1823 60/641.2 |
| 2014/0206912 | A1 | | 7/2014 | Iglesias |

FOREIGN PATENT DOCUMENTS

| | | |
|---|---|---|
| JP | S60-040787 A | 3/1985 |
| JP | S64-007227 B2 | 2/1989 |
| JP | H01-232175 A | 9/1989 |
| JP | 2004-510920 A | 4/2004 |
| JP | 2011-052621 A | 3/2011 |
| JP | 2011-169188 A | 9/2011 |
| JP | 2012-500925 A | 1/2012 |
| JP | 2013-164062 A | 8/2013 |
| JP | 2013-543948 A | 12/2013 |
| JP | 2014-047676 A | 3/2014 |
| JP | 2014-084857 A | 5/2014 |
| JP | 2014-227962 A | 12/2014 |
| JP | 5791836 B1 | 10/2015 |
| WO | 2013/115656 A1 | 8/2013 |

* cited by examiner

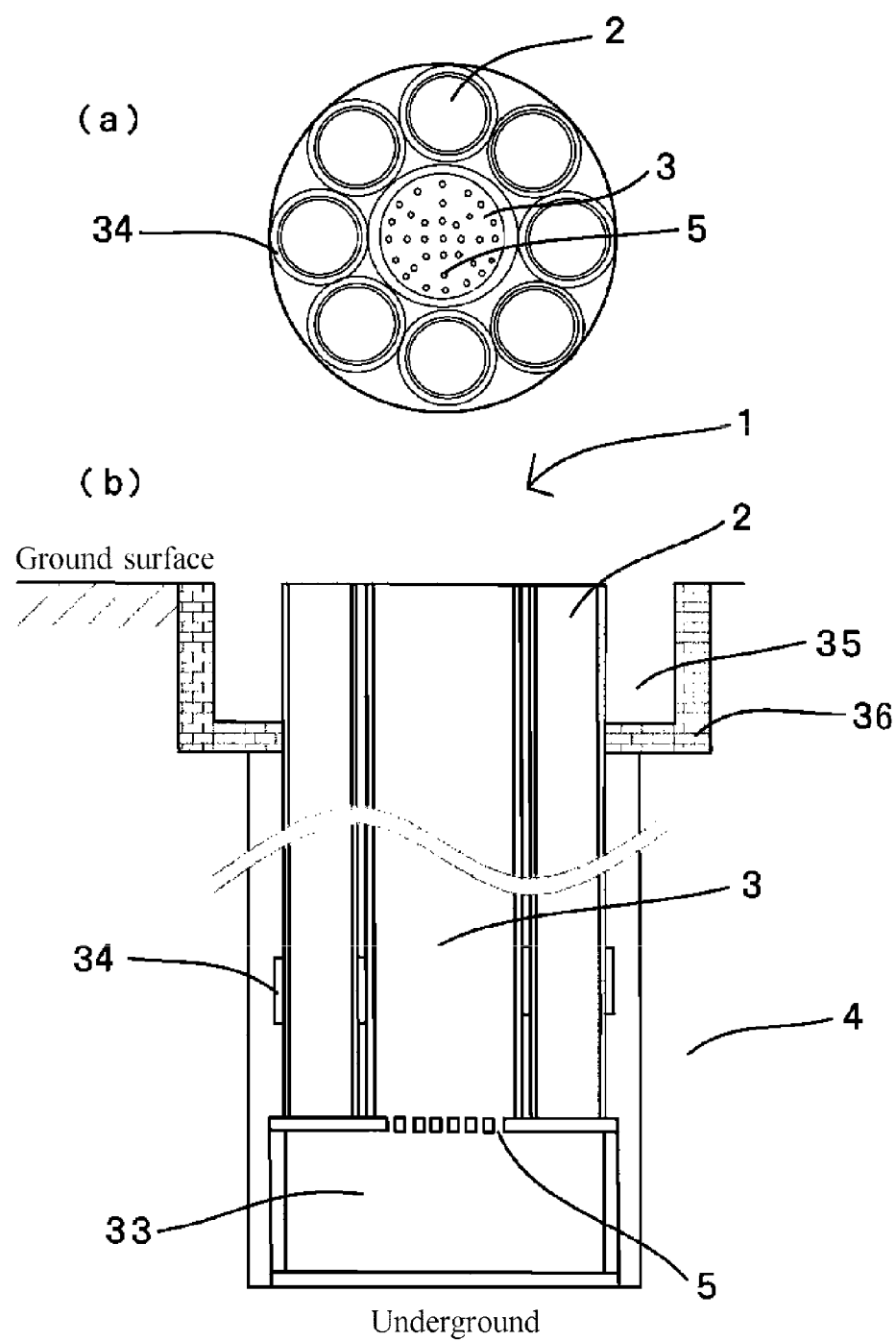

BOILING-WATER GEOTHERMAL HEAT EXCHANGER AND BOILING-WATER GEOTHERMAL POWER GENERATION EQUIPMENT

CROSS REFERENCE TO RELATED APPLICATIONS

This patent application is a U.S. national stage application under 35 U.S.C. §371 of International Patent Application No. PCT/JP2015/061172 filed on Apr. 9, 2015, which claims the benefit of foreign priority to Japanese Patent Application Nos. JP 2014-117043 filed on Jun. 5, 2014, and JP 2014-202713 filed on Oct. 1, 2014.

BACKGROUND OF THE INVENTION

Technical Field

The present invention relates to a boiling-water geothermal heat exchanger which is capable of extracting geothermal energy with high efficiency and also relates to a boiling-water geothermal power generation equipment.

Background Art

Geothermal power generation which utilizes geothermal energy to generate electric power is to use a high-temperature magma layer as a heat source and is able to utilize semi-permanent thermal energy. The above-described power generation will not produce a greenhouse effect gas in the course of electric power generation and has thus captured attention as an alternative means of fossil fuel in recent years.

In conventional geothermal power generation, boring is conducted at a geothermal region to extract natural steam and hot water present in the geothermal region by utilizing a natural pressure, thereby generating electric power. The thus extracted steam and hot water contain a large amount of sulfur and other impurities unique to a geothermal region. The impurities adhere to a thermal well, piping and a turbine, etc., as scale. Upon adhesion of scale, a power plant is decreased in output over time, thus resulting in difficulty in prolonged use.

For the purpose of solving the problem resulting from scale, a technology which adopts a process in which water is fed from the ground, heated by heat supplied from a geothermal region to extract hot water, has been disclosed in Patent Document 1.

PRIOR ART DOCUMENTS

Patent Literature

Patent Document 1: Japanese Published Unexamined Patent Application No. 2011-52621

SUMMARY OF THE INVENTION

Problems to be Solved by the Invention

The above-described technology is to extract a high-pressure single-phase flow which has been extracted by a geothermal heat exchanger installed underground as steam by the use of a water separator installed on the ground. And, the technology is quite effective in solving the problems resulting from scale and also attaining effective use of geothermal power.

Geothermal heat exchange also has the following problems. First, due to the fact that water fed underground and hot water extracted by the supply of geothermal power undergo pressure loss in piping, a high-pressure pump with great power is required. In order to efficiently generate electric power, with the power of the pump kept low, it is necessary to increase the diameter of a geothermal heat exchanger, and thus poses a problem.

Secondly, such a problem is also posed that heat is delivered and received between hot water which comes out from a geothermal heat exchanger, water which is fed therein, and an underground low-temperature region, thereby causing heat loss. Therefore, a geothermal heat exchanger is required to be thermally insulated at a heat-loss occurring part thereof. In order to secure a space for heat insulation, it is necessary to design the geothermal heat exchanger so as to be increased in diameter, which will contribute to an increase in boring costs and manufacturing costs of the geothermal heat exchanger.

Thirdly, the technology disclosed in Patent Document 1 has an advantage in being able to replace an existing bore hole. However, there is a problem that the diameter of a geothermal heat exchanger is restricted and a bore hole which is to be replaced is accordingly restricted. Even in such a case that evaluation is made for possible replacement of a bore hole for geothermal exploration and a bore hole which is out of operation, besides possible replacement of an existing bore hole, the diameter size of the geothermal heat exchanger may cause difficulties.

The present invention has been made for solving the above-described problems, an object of which is to provide a boiling-water geothermal heat exchanger and boiling-water geothermal power generation equipment which are capable of suppressing the occurrence of pressure loss and heat loss in piping and decreasing the diameter of a pipe buried underground to reduce an amount of water to be circulated and which are excellent in heat exchange efficiency.

SUMMARY OF THE INVENTION

Means for Solving the Problems

In order to solve the above-described problems, the boiling-water geothermal heat exchanger is a boiling-water geothermal heat exchanger which is provided with a water injection pipe which is installed underground and to which water is supplied from the ground and a steam extraction pipe which is installed underground so as to be in contact with the water injection pipe and has a plurality of ejection ports, in which a pressure inside the steam extraction pipe is reduced to the vicinity of a pressure required by a turbine, high-pressure hot water which is produced by supplying heat from a geothermal region to water inside the water injection pipe (hereinafter referred to as high-temperature pressurized water) is changed to a single-phase flow of steam inside the steam extraction pipe present underground via the ejection ports, and the single-phase flow of steam is extracted on the ground, and in which a heat insulation portion is formed at a part which is in contact with a low-temperature region close to the ground surface and the heat insulation portion is such that the level of the water supplied to the water injection pipe is lowered to form an air layer at an upper part of the water injection pipe.

The water supplied to the water injection pipe is turned at a lower part of the water injection pipe to high-temperature pressurized water having a pressure which is substantially proportional to the depth from the ground. A pressure inside the steam extraction pipe is reduced to the vicinity of a pressure required by a turbine. Therefore, the high-temperature pressurized water is ejected into the steam extraction pipe via the ejection ports installed on the steam extraction pipe by a hydraulic pressure thereof and changed to a single-phase flow of steam inside the steam extraction pipe which is reduced in pressure. The single-phase flow of steam is extracted on the ground.

Steam inside the steam extraction pipe moves to the turbine having a pressure gradient and, thereafter, expands inside the turbine, giving power for rotating the turbine. The steam coming out from the turbine is turned to water at a condenser and again fed into the water injection pipe. An amount of circulating water is equal to an amount of steam required by the turbine, thus making it possible to greatly decrease an amount of the circulating water. The above-described course is repeated, thus making it possible to extract geothermal power efficiently and continuously.

Further, in the process disclosed in Patent Document 1, pressurized water is extracted on the ground and reduced in pressure for evaporation. However, under conditions that electric power output is given as 60 kW and a temperature of steam and a pressure of steam are the same, an amount of steam contained in the pressurized water is approximately 5% or less. In contrast, the present invention circulates only a necessary amount of steam and, therefore, there may be circulated only an amount of water equivalent to approximately 1/20 of water required by the process disclosed in Patent Document 1.

Geothermal heat exchange is conducted according to the above-described process, thus making it possible to extract steam lower in thermal conductivity and frictional resistance than hot water and also to suppress heat loss occurring in passage through a low-temperature region and pressure loss occurring in piping due to friction in passage through the surface of piping. It is, thus, possible to decrease the diameter of a pipe buried underground and conduct heat exchange by saving an amount of water to be circulated.

It is also possible to suppress heat loss occurring in passage through a low-temperature region close to the ground surface. Formation of a heat insulation portion by using a material high in heat insulation enables to further increase the efficiency of extracting geothermal energy.

In addition, depending on a targeted geothermal layer, there is a case in which a hydraulic pressure supplied to a geothermal heat exchanger which is installed underground becomes excessively great. Where it is necessary to lower the hydraulic pressure, the water injection pipe is decreased in level of water, thus making it possible to adjust a pressure inside the geothermal heat exchanger. Thereby, an air layer is formed at an upper part of the water injection pipe and the air layer which is higher in heat insulation is inevitably able to provide heat insulation effects. In particular, where a bore hole is significantly deep at a high-temperature region, highly treated water supplied to the water injection pipe is decreased in level thereof, thus making it possible to form an air layer in the water injection pipe in contact with a low-temperature region which is close to the ground surface.

The boiling-water geothermal heat exchanger of the present invention can be arranged so that a pressure pump for pressurizing water to be supplied to the water injection pipe is disposed on the ground.

On large-scale generation of electric power, an amount of circulating water is increased, which results in an increase in loss of head at an outer pipe portion. However, such an arrangement is made that a pressure pump for pressurizing water to be supplied to the water injection pipe is disposed on the ground, by which an increased portion of the loss of head can be supplemented to yield a greater pressure than a natural hydraulic pressure. It is, thus, possible to generate electric power on a large scale. Such an arrangement is also made that a pressure pump for pressurizing water to be supplied to the water injection pipe is disposed on the ground, by which a pressure of steam can be raised. It is, therefore, possible to apply the boiling-water geothermal heat exchanger of the present invention widely in high-temperature geothermal regions which are not yet tapped.

In the boiling-water geothermal heat exchanger of the present invention, where the water injection pipe is disposed outside the steam extraction pipe, such an arrangement is made that the plurality of water injection pipes are disposed along an outer circumference of the steam extraction pipe in a circumferential direction of the steam extraction pipe and water injected into each of the water injection pipes flows into a bottom layer portion installed below the steam extraction pipe. And, such an arrangement can be made that an ejection port is installed at a boundary between the bottom layer portion of the water injection pipe and the steam extraction pipe.

The plurality of water injection pipes are disposed along the outer circumference of the steam extraction pipe in the circumferential direction of the steam extraction pipe. Thereby, as compared with a case where there is provided a single water injection pipe which is an outer pipe, a heat transfer surface area on which heat is transferred from a geothermal region is increased about two times. Therefore, heat conduction performance is improved to contribute to reduction in construction costs.

Where the plurality of water injection pipes are disposed along the outside of the steam extraction pipe in the circumferential direction, the water injection pipe is in contact with the steam extraction pipe at an extremely narrow area. Therefore, it is difficult to install a great number of ejection ports at a boundary between the water injection pipe and the steam extraction pipe. However, such an arrangement is made that water injected into each of the water injection pipes flows into a bottom layer portion installed below the steam extraction pipe, thereby installing the ejection ports at a boundary between the bottom layer portion of the water injection pipe and the steam extraction pipe. Then, the arrangement is able to solve the above-described problem.

In the boiling-water geothermal heat exchanger of the present invention, an insertion pipe which is formed as a combination of at least the one water injection pipe and at least the one steam extraction pipe is arranged so as to be inserted into a plurality of geothermal wells. And, such an arrangement can be made that outlets of the steam extraction pipes are connected in parallel to collect steam obtained from each of the geothermal wells in an aggregate manner, and there is installed a steam header which makes pressures of the thus collected steam uniform.

Both temperatures and pressures are different depending on the site to be subjected to boring, and upon generation of electric power, electric power generated at each geothermal well is different in output. Thus, regarding a plurality of geothermal wells, outlets of the steam extraction pipes of the insertion pipes are connected in parallel to collect steam obtained through each of the geothermal wells in an aggregate manner. Thereby, a turbine, a condenser, a generator, a transformer, etc., can be designed to be larger in capacity, which is advantageous in increasing the efficiency of a power plant as a whole. Further, the steam header can be disposed to make pressures of collected steam uniform.

In the boiling-water geothermal heat exchanger of the present invention, the above-described geothermal well can be attached to existing facilities.

The insertion pipe which is formed as a combination of the water injection pipe and the steam extraction pipe is used by being inserted into an empty geothermal well or a geothermal well out of operation which is attached to existing facilities. It is, thereby, possible to extract energy derived from hot water without newly conducting boring. In particular, the insertion pipe can be decreased in diameter by extracting steam as a single-phase flow of steam. Therefore, a geothermal well which is usable is increased in degree of freedom.

In the boiling-water geothermal power generation equipment of the present invention, electric power is generated by using the boiling-water geothermal heat exchanger of the present invention.

Further, the boiling-water geothermal power generation equipment of the present invention is able to conduct the electric power generation by a binary process.

The boiling-water geothermal heat exchanger of the present invention is able to suppress the pressure loss and heat loss occurring in piping, decrease the diameter of a pipe which is buried underground and also reduce an amount of circulating water, thereby realizing an excellent efficiency of heat exchange. Therefore, the geothermal heat exchanger can be used to attain effective utilization of a geothermal well which is attached to existing facilities and conduct geothermal power generation with high efficiency. It is, thus, possible to provide geothermal power generation equipment which is great in convenience.

Effects of the Invention

The present invention provides the boiling-water geothermal heat exchanger which is excellent in heat exchange efficiency and which is able to suppress the pressure loss and heat loss occurring in piping and decrease the diameter of a pipe which is buried underground, thereby reducing an amount of circulating water and also provides the boiling-water geothermal power generation equipment.

BRIEF DESCRIPTION OF THE DRAWINGS

FIG. 9 is a drawing which shows a geothermal heat exchanger in which a plurality of water injection pipes are disposed in the circumferential direction of a steam extraction pipe.

DETAILED DESCRIPTION OF THE PREFERRED EMBODIMENTS

Hereinafter, a description will be given of the boiling-water geothermal heat exchanger and the boiling-water geothermal power generation equipment of the present invention with reference to the embodiments thereof.

Figure 1:
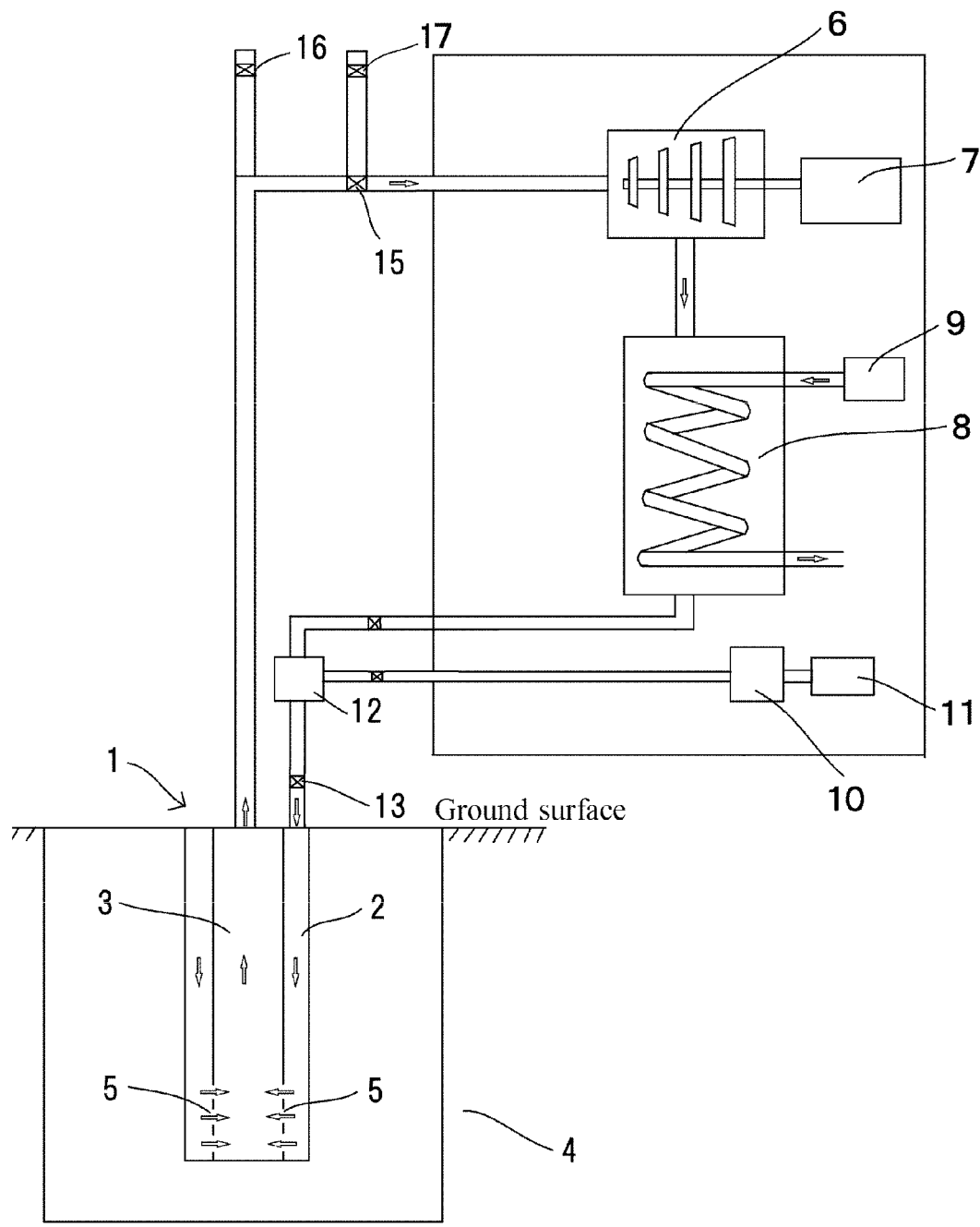
FIG. 1 is a drawing which shows a boiling-water geothermal heat exchanger and boiling-water geothermal power generation equipment according to an embodiment of the present invention.

In FIG. 1, a geothermal heat exchanger 1 is provided with a water injection pipe 2 which is installed underground and to which water is supplied from the ground and a steam extraction pipe 3 which is installed underground so as to be in contact with the water injection pipe 2. In FIG. 1, the water injection pipe 2 is given as an outer pipe closer to a geothermal region 4 and the steam extraction pipe 3 is given as an inner pipe installed inside the water injection pipe 2, thereby providing a double pipe structure. However, the steam extraction pipe 3 may be given as an outer pipe and the water injection pipe 2 may be given as an inner pipe.

The steam extraction pipe 3 is provided at a lower part thereof with a plurality of ejection ports 5, and the water injection pipe 2 and the steam extraction pipe 3 are kept open by these ejection ports 5. That is, the ejection ports 5 are installed at a boundary between the water injection pipe 2 and the steam extraction pipe 3. The steam extraction pipe 3 is connected to a turbine 6, and a pressure inside the steam extraction pipe 3 is reduced to the vicinity of a pressure required by the turbine 6.

Water supplied to the water injection pipe 2 by the use of a natural fall in water level is given a pressure which is substantially proportional to the depth from the ground at the vicinity of a bottom of the water injection pipe 2 and turned to high-temperature pressurized water by heat supplied from a geothermal region 4. Since a pressure is reduced inside the steam extraction pipe 3, a difference in pressure thereof is used to eject the high-temperature pressurized water into the steam extraction pipe 3 in a state of atomization through the ejection ports 5 as shown by the arrows. A difference between the pressure required by the turbine 6 and the pressure at the bottom of the water injection pipe 2 is utilized for evaporation and the water is changed into a single-phase flow of steam. The single-phase flow of steam which is produced underground moves to the turbine 6 by a difference in pressure between the steam extraction pipe 3 and the turbine 6 and, thereafter, expands inside the turbine 6, thereby giving power for rotating the turbine 6. Electric power is generated by a generator 7 which is thus powered.

Steam which has come out from the turbine 6 is subsequently cooled with cooling water 9 by a condenser 8 and turned to water which is again supplied to the water injection pipe 2. The amount of circulating water is equal to the amount of steam required by the turbine 6 and, therefore, the amount of the circulating water can be saved to a great extent. The above-described course is repeated to extract geothermal power continuously. Makeup water 11 is supplemented via a water treatment device 10 from a makeup water tank 12, when such a necessity arises. The makeup water 11 is adjusted for its water level by using a makeup water adjusting valve 13. A steam adjusting valve 15 is installed between the steam extraction pipe 3 and the turbine 6. A pressure adjusting valve 17 is also installed.

Where major components such as the turbine 6 and the generator 7 are malfunctioning or a transmission system is malfunctioning, a breaker of the generator 7 is actuated. In this case, in order to prevent a sudden elevation of pressure inside the geothermal heat exchanger 1, an emergency pressure reduction valve 16 can be actuated to prevent a sudden elevation of pressure inside the geothermal heat exchanger 1. The geothermal heat exchanger 1 is able to automatically cope with an ordinary load change of the generator. Where the generator is increased in load, the pressure inside the geothermal heat exchanger 1 is reduced to increase steam production. Where the generator is decreased in load, the pressure inside the geothermal heat exchanger 1 is elevated to decrease steam production. As described so far, the geothermal heat exchanger 1 has a feature in which a series of functions for automatically controlling electric power generation are provided.

Figure 2:
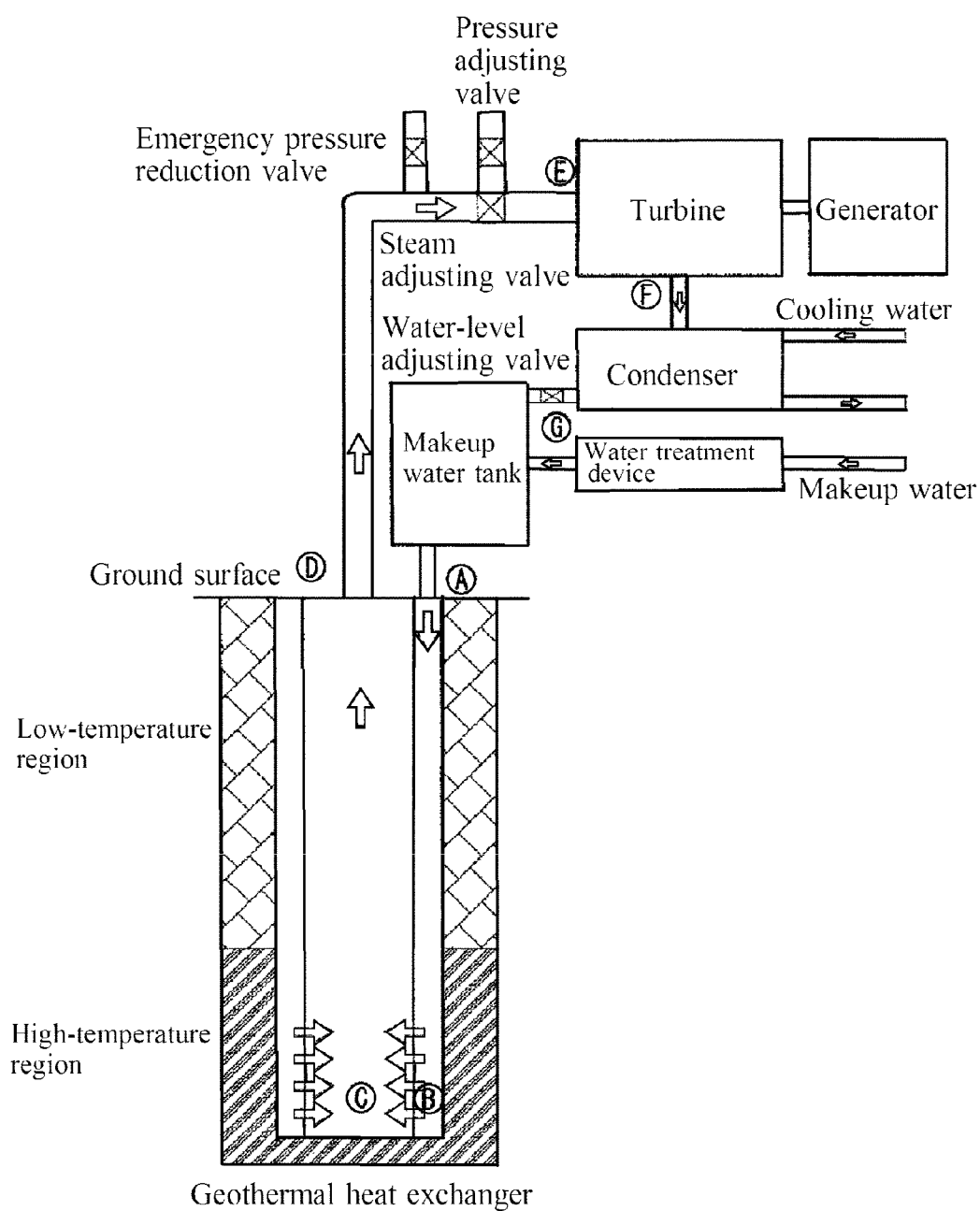
FIG. 2 is a drawing which shows a flow and a pressure gradient of the boiling-water geothermal heat exchanger according to the embodiment of the present invention.

FIG. 2 shows a flow and a pressure gradient of the boiling-water geothermal heat exchanger according to an embodiment of the present invention. Further, pressures at individual points of A to G shown in FIG. 2 are shown in Table 1 in terms of MPa. In addition, values shown below are, as will be described later, provided under the conditions that electric power of 60 kW is generated at a bore hole in which a temperature at the deepest part of a geothermal region at a depth of 700 m is about 180° C. However, individual values are not limited thereto and are established by being changed whenever necessary, depending on the situation of the bore hole and electric power output.

TABLE 1

| Places | Names | Pressure (MPa) |
| --- | --- | --- |
| A | Inlet of water injection pipe | 0.10 |
| B | Bottom of water injection pipe | 6.86 |
| C | Side of steam extraction pipe | 0.543 |
| D | Outlet of steam extraction pipe | 0.543 |
| E | Inlet of turbine | 0.50 |
| F | Outlet of turbine | 0.15 |
| G | Outlet of condenser | 0.02 |

In FIG. 2, water is supplied to the water injection pipe portion through piping from G to A to which a fall in water level is given. Upon injection of water, a water-level adjusting valve can be used to adjust the water level in the makeup water tank. This adjustment is made by measuring the water level in the makeup water tank and that inside the water injection pipe to feed back measurements. At B point, water becomes greatest in hydraulic pressure and heat is supplied from a high-temperature region. Pressurized water ejected at C point from B point is reduced in pressure and evaporated. At D point, a pressure adjusting valve is used to set a pressure of saturated steam at 155° C. to 0.543 MPa. The pressure is set by using the pressure adjusting valve. At the start of operation, steam is introduced into the turbine by using a steam adjusting valve. At E point, steam is supplied into the turbine at a pressure of 0.5 MPa. When an abrupt elevation of pressure is found, an emergency pressure reduction valve is used to release the steam into the atmosphere.

Figure 3:
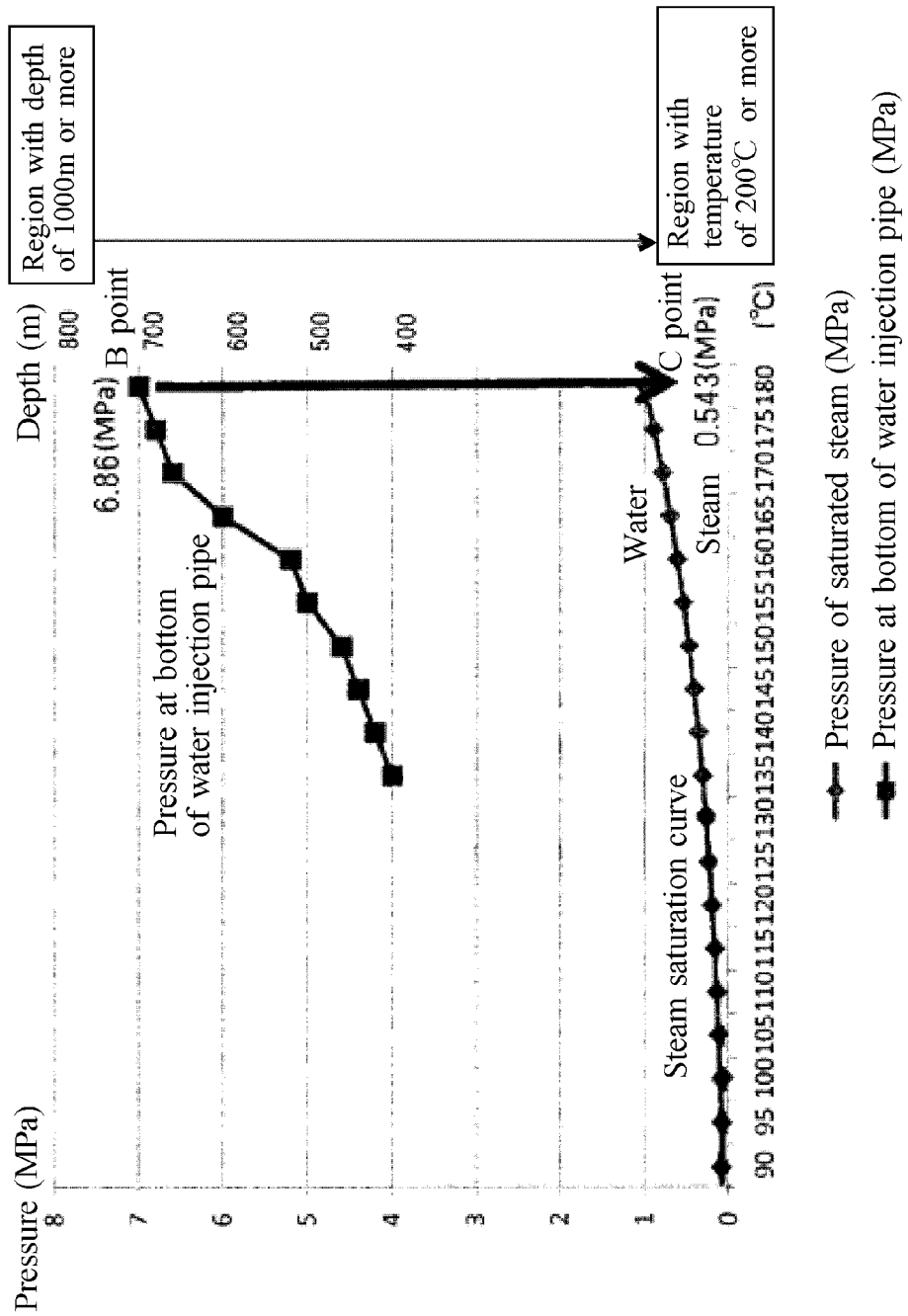
FIG. 3 is a drawing which shows a phase diagram of water and a mechanism of reduction in pressure.

FIG. 3 shows a phase diagram of water and a mechanism of reduction in pressure. In FIG. 3, the horizontal axis denotes a temperature (° C.), and the longitudinal axis denotes a pressure (MPa) which will occur in association with a depth at a bottom of the water injection pipe of the geothermal heat exchanger.

A region at a depth of 700 m is subjected to a pressure of 6.86 MPa, and at a bore hole in which a temperature at a geothermal region at a depth of 700 m is about 180° C., upon ejection of high-temperature pressurized water from a bottom of the water injection pipe to the steam extraction pipe, water at 180° C. is evaporated at 1.004 MPa due to the fact that a pressure inside the steam extraction pipe is about 0.543 MPa. Therefore, the high-temperature pressurized water is instantly evaporated inside the steam extraction pipe. The above-described mechanism is utilized to produce a single-phase flow of steam inside the steam extraction pipe installed underground and extract the steam on the ground. Since a pressure required by the turbine is 0.5 MPa, electric power can be generated quite easily.

As described so far, in the boiling-water geothermal heat exchanger of the present invention, water supplied to the water injection pipe 2 by utilizing a natural fall in water level lowers, while being heated from the geothermal region 4 around the water. Thus, at a lower part of the water injection pipe 2, the water is turned to high-temperature pressurized water. The high-temperature high-pressure water is ejected from the lower part of the water injection pipe 2 via the ejection ports 5 into the steam extraction pipe 3 in a state of atomization. At the lower part of the steam extraction pipe 3, a difference between a saturation pressure which is slightly higher than the pressure required by the turbine 6 and a pressure at the bottom of the water injection pipe 2 is utilized to cause evaporation. A pressure at the upper part of the steam extraction pipe 3 is set so as to be slightly higher than the pressure required by the turbine 6 and can be automatically kept substantially constant, keeping balance with a load of the generator 7 which is a load of the turbine 6. A difference in pressure between the lower part of the water injection pipe 2 and the turbine 6 is quite great, thus making it possible to produce continuously steam at a pressure and a flow rate required by the turbine 6. Steam which has come out from the turbine 6 is cooled by the condenser 8 and reverted to water. And, the water is again fed into the water injection pipe 2. Since the amount of circulating water is equal to an amount of steam required by the turbine 6, the circulating water is quite small in amount. Therefore, a pressure pump for supplying water to the upper part of the water injection pipe 2 is not essential.

In the present invention, the highly treated water is fed into the lowest part of the water injection pipe 2 by utilizing a natural pressure, thereby forming a pressure gradient. A pressure at the upper part of the steam extraction pipe 3 is an inlet pressure required by the turbine 6, and pressure loss occurring inside the steam extraction pipe 3 and in piping is a value which is lower than the above-described pressure by one order. Theoretically, the depth of a bore hole is sufficient if the depth can provide an amount of pressure required by the turbine 6, and the present invention is applicable to a high-temperature zone in a geothermal region.

In general, a geothermal well, the depth of which is 500 m or more, is able to set an ejecting pressure so as to be high by utilizing only a hydraulic pressure. Therefore, a pressure pump is not essential. Further, only evaporated steam ascends inside the steam extraction pipe 3, and power for pushing up water which is needed in extracting hot water is not needed. Thus, the above-described geothermal well is quite advantageous in terms of an energy balance between energy necessary for obtaining thermal energy from underground and energy which is to be extracted. Still further, as shown in FIG. 3, in a geothermal region, the depth of which is in excess of 1000 m and the temperature of which is in excess of 200° C., it is, in principle, possible to produce steam having a pressure of 1 MPa or more and a temperature of 200° C. or higher. Thus, electric power can be generated on a large scale and geothermal power can be regarded as renewable energy.

In the boiling-water geothermal heat exchanger of the present invention, there is adopted a process in which a single-phase flow of steam is produced inside the steam extraction pipe 3 installed underground and the flow is extracted on the ground. It is, thus, necessary to evaluate an extent of heat loss in passage of the single-phase flow of steam through a low-temperature region near the ground surface. Table 2 shows the thermal conductivity (W/mK) of saturated water and that of saturated steam by comparison.

TABLE 2

| Temperature (° C.) | Saturated water | Saturated steam |
|---|---|---|
| 120 | 0.685 | 0.0259 |
| 140 | 0.684 | 0.0281 |
| 160 | 0.680 | 0.0305 |
| 180 | 0.672 | 0.0330 |
| 200 | 0.661 | 0.0361 |

As apparent from Table 2, at a target temperature range of 155° C., heat loss which occurs upon extraction of steam is only 4.5%, as compared with heat loss which occurs upon extraction of hot water, and the heat loss is quite small in association with extraction of steam. As described above, in principle, although heat loss is kept small, a heat insulation portion can be installed whenever necessary. A site at which the heat insulation portion is provided is preferably a part where the water injection pipe 2 is in contact with a low-temperature region and a boundary between the water injection pipe 2 and the steam extraction pipe 3. In particular, where the depth of a bore hole at a high-temperature region is great, the level of highly treated water which is supplied to the water injection pipe 2 is lowered, by which an air layer is formed at the water injection pipe 2 in contact with a low-temperature region close to the ground surface, thus making it possible to further improve heat insulation effects. Further, the surface which is in contact with a high-temperature region at the lower part of the water injection pipe 2 is made so as to easily absorb geothermal power by using a material excellent in heat conductivity.

The plurality of ejection ports 5 installed at the lower part of the steam extraction pipe 3 are formed by boring small-diameter holes. The diameter, the number, and the flow speed thereof are designed individually depending on the capacity of electric power generation, the temperature of a bore hole, and the depth. As an example thereof, when the diameter of the water injection pipe 2 is 165.2 mm and the diameter of the steam extraction pipe 3 is 89.1 mm, installed are 100 ejection ports, each of which is 2 mm in diameter.

Table 3 shows the details of the ejection port 5 which is thus designed.

TABLE 3

| | | | | |
|---|---|---|---|---|
| Diameter of ejection port | | | 0.002 | m |
| Cross-sectional area of ejection port | | | 0.000003 | m² |
| Number of ejection ports | | | 100 | Number of ports |

| | | | Present invention | General-purpose high-pressure washing machine |
|---|---|---|---|---|
| r | Density of hot water | kg/m³ | 1000 | |
| $P_0$ | Water pressure inside piping | $P_a$ | 6,860,000 | 10,000,000 |
| P | Pressure of steam | $P_a$ | 543,100 | |
| Q | Amount of water | m³/h | 2.2 | 0.5 |
| A | Cross-sectional area of ejection port | m² | 0.000003 | |
| V | Flow speed at ejection port | m/S | 1.95 | |

P = saturation pressure × 1000000 (Pa)

As shown in Table 3, the flow speed at the ejection port 5 under the above-described design conditions is 1.95 m/s, and other specifications are not greatly different from those of a general-purpose high-pressure washing machine. There is no difficulty in manufacturing.

The geothermal heat exchanger 1 can be arranged so that an insertion pipe which is formed as a combination of at least one water injection pipe and at least one steam extraction pipe is inserted into a plurality of geothermal wells in which outlets of the steam extraction pipes are connected in parallel to collect steam obtained from each of the geothermal wells in an aggregate manner and a steam header is provided for making pressures of thus collected steam uniform.

Usage is also possible in which one insertion pipe is inserted into one geothermal well. However, both temperatures and pressures are different depending on the site to be subjected to boring, and upon generation of electric power, electric power generated at each geothermal well is different in output. Thus, with regard to a plurality of geothermal wells, outlets of the steam extraction pipes of the insertion pipes are connected in parallel to collect steam obtained from each of the geothermal wells in an aggregate manner. Thereby, a turbine, a condenser, a generator, a transformer, etc., are designed to be larger in capacity, which is advantageous in increasing the efficiency of a power plant as a whole. Further, the steam header can be disposed to make pressures of collected steam uniform, and the steam which is made uniform in pressure can be supplied to a single unit of a turbine.

For example, where three geothermal wells are used, the thermal output of each of the geothermal wells is converted to the output of a generator, which is to be 500 kW for a first well, 400 kW for a second well, and 600 kW for a third well. In this case, rather than composing an electric power generation system with three independent units, these wells are designed so as to give one unit consisting of the first well+the second well+the third well of 1500 kW in an aggregate manner. Thereby, although a total output is the same, the turbine, the condenser, the generator, and the transformer can be individually designed so as to give a greater capacity. Since electric equipment is increased in efficiency in accordance with the capacity, a power plant is increased in total efficiency when used in generating electric power. It is also possible to significantly decrease building expenses such as construction costs.

Further, the geothermal heat exchanger 1 can be used not only in a newly-built geothermal well but also used in a geothermal well attached to existing facilities, for example, an existing geothermal power plant, that is, an empty geothermal well or a geothermal well which is out of operation by inserting an insertion pipe arranged as a combination of the water injection pipe 2 and the steam extraction pipe 3. In particular, steam can be extracted from underground as a single-phase flow of steam, which enables use of an insertion pipe smaller in diameter. Thus, a usable geothermal well can be increased in degree of freedom to promote the effective use of an existing geothermal well.

As described so far, existing bore holes including a bore hole which is out of operation can be replaced to greatly shorten time necessary for making environmental assessment and greatly save development costs. There is no need for building a supplementary hole which is necessary for conventional-type geothermal power generation. Further, since any geothermal fluid is not used at all, corrosion resulting from scale is similar in level to that occurring in ordinary water piping and equipment, and maintenance may be provided as frequently as that provided in equipment used in general industries, which is convenient. It is also possible to eliminate concern for depletion of hot spring sources and drastically alleviate environmental problems.

In the boiling-water geothermal heat exchanger of the present invention, steam is produced underground, thereby eliminating a necessity for providing a steam generator which is a pressure vessel ordinarily installed on the ground. Therefore, building expenses for the steam generator are not necessary and a whole system can be controlled by simpler design. Installation of the steam generator is not necessary, which will, therefore, eliminate a necessity for having technical personnel for dealing with a pressure vessel. And, personnel involved in maintenance can be reduced in number, thereby contributing to reduction in operation costs.

Further, in the boiling-water geothermal heat exchanger of the present invention, a pressure pump for pumping underground water is not essential, which reduces costs necessary for installing the pressure pump. Still further, a whole system can be controlled by simpler design. In addition, the steam generator is not needed or the pressure pump is not essential, thus making it possible to save building costs required for installing facilities on the ground. When consideration is given to the fact that many geothermal regions are located in national parks, environmental burden occasioned by construction of facilities for electric power generation can be reduced.

In the present invention, water is supplied to the deepest part of a bore hole from the ground on the condition that constant heat is available at the deepest region of the bore hole, irrespective of whether the existing bore hole is for electric power generation or for a hot spring, by which the bore hole can be used again. In this case, an ordinary pipe can be sufficiently used as a pipe for supplying water.

Table 4 shows by comparison the performance of the single-phase flow process of pressurized water disclosed in Patent Document 1 and that of the single-phase flow process of steam in the present invention, when electric power is to be generated at 60 kW.

TABLE 4

| Comparison items | Single-phase flow process of steam | Single-phase flow process of pressurized water |
|---|---|---|
| Electric power output to be compared | 60 kW | 60 kW |
| Steam generator | Not necessary (functioning by underground geothermal heat exchanger) | Necessary (facilities on the ground) |
| Capacity of pressure pump | Pump is not essential due to use of hydraulic pressure. | 9.7 kW Due to a great amount of water, loss of head is great and a pump is increased in capacity. |
| Amount of necessary water | 0.0006 m$^3$/S Since water is turned to steam underground for extraction, only an amount of water necessary for the turbine may be circulated. | 0.0117 m$^3$/S Percentage of steam contained in saturated water is less than 10% in a range to which the present calculation is applied. Thus, a great amount of water is necessary. |
| Diameter size of pipe to be inserted into bore hole | Outer pipe 165.2 mm Inner pipe 89.1 mm An amount of necessary water is only 1/20 as compared with that necessary for the single-phase flow process of pressurized water, and due to passage of steam through outlets, loss of head is negligibly small. | Outer pipe 216.3 mm Inner pipe 139.8 mm As compared with the single-phase flow process of steam, the amount of necessary water is about 20 times greater. Thus, loss of head is made greater. Since loss of head is proportional to the square of flow speed, the diameter of a pipe is required to be increased due to a necessity for lowering the flow speed. |
| Effects thereof | Building costs can be saved. Replacement can be made at wider applications. | |
| Difference in heat loss | Heat loss is quite small as compared with that occurring in the single-phase flow process of pressurized water. Thus, heat insulation of an outer pipe portion, etc., is not essential. | Heat insulation is to be provided at a necessary place such as an outer pipe portion of double pipe. |

TABLE 4-continued

| Comparison items | Single-phase flow process of steam | Single-phase flow process of pressurized water |
|---|---|---|
| Efficiency including that of pump | 100% | 85% |
| Targets to be introduced | No influences by depth of a bore hole Applicable to both a bore hole which is out of operation and that in operation. Replaceable for any electric power generation process including existing processes Not restricted by capacity whether electric power is generated on a large scale or a small scale. | Suitable for a geothermal region which is relatively shallow in depth Replaceable for an existing bore hole which is out of operation. However, a bore hole to be replaced is restricted, depending on the depth of a bore hole, the diameter thereof and temperatures. |
| Maintenance properties | Pressure pump and steam generator are free of maintenance. | Maintenance is necessary for pressure pump and steam generator. |
| Comprehensive assessment | Applicable to bore holes at any depth Building costs can be saved. System can be arranged simply. | Suitable for a geothermal region which is shallow in depth Building costs are relatively high. |

Figure 4:
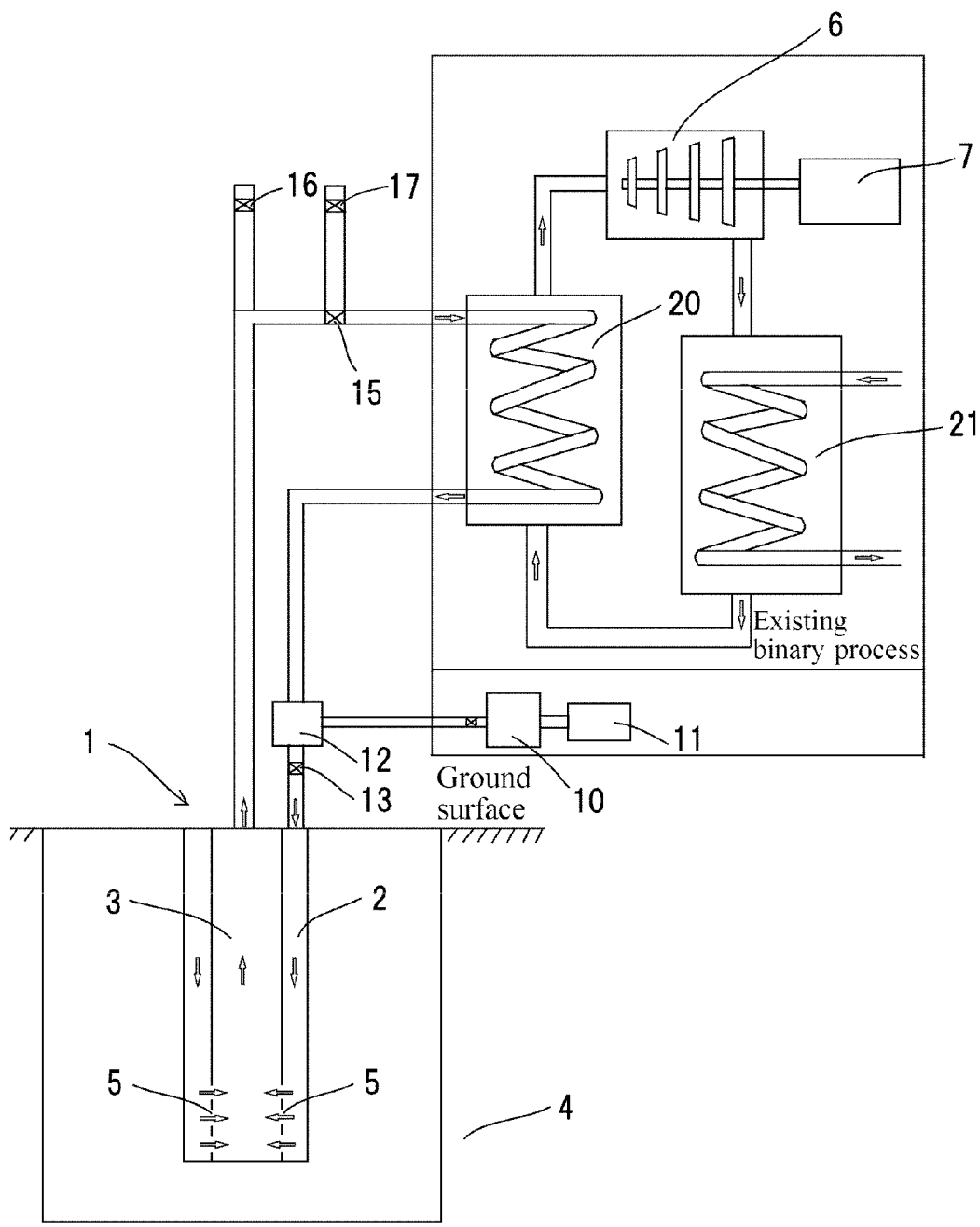
FIG. 4 is a drawing which shows an arrangement of boiling-water geothermal power generation equipment in which the boiling-water geothermal heat exchanger of the present invention is applied to electric power generation by a binary process.

FIG. 4 shows an arrangement of the boiling-water geothermal power generation equipment in which the boiling-water geothermal heat exchanger of the present invention is applied to electric power generation by a binary process.

In FIG. 4, functions of the geothermal heat exchanger 1 are the same as those described based on FIG. 1. A single-phase flow of steam extracted from the steam extraction pipe 3 of the geothermal heat exchanger 1 is sent to an evaporator 20 to heat a low-boiling point medium. The thus heated low-boiling point medium is turned to steam of a low-boiling point medium and the steam moves to the turbine 6, thereby giving power for rotating the turbine 6. Electric power is generated by the generator 7 which is thus powered.

The steam of the low-boiling point medium coming out from the turbine 6 is thereafter cooled with cooling water by the use of a cooling condenser 21, and reverted to the low-boiling point medium which is sent to the evaporator 20. The above-described course is repeated to continuously generate electric power. Makeup water 11 is supplemented via a water treatment device 10 from a makeup water tank 12, whenever necessary. The makeup water 11 is adjusted for the level thereof by a makeup water adjusting valve 13. A steam adjusting valve 15 is installed between the steam extraction pipe 3 and the turbine 6.

Hereinafter, a description will be given of setting of values such as temperatures and pressures of steam in the boiling-water geothermal heat exchanger of the present invention.

Table 5 shows the specifications of a commercially available turbine which is used.

TABLE 5

| Boost pressure | Exhaust pressure (MPa) | | | | |
|---|---|---|---|---|---|
| MPa | 0.2 | 0.15 | 0.1 | 0.05 | 0 |
| 0.55 | 60 2.4 | 75 2.4 | 90 2.4 | 105 2.4 | 120 2.4 |

TABLE 5-continued

| Boost pressure | Exhaust pressure (MPa) | | | | |
|---|---|---|---|---|---|
| MPa | 0.2 | 0.15 | 0.1 | 0.05 | 0 |
| 0.50 | 45 2.2 | 60 2.2 | 75 2.2 | 90 2.2 | 110 2.2 |
| 0.45 | 30 2.0 | 50 2.0 | 65 2.0 | 80 2.0 | 95 2.0 |
| 0.40 | | 35 1.9 | 50 1.9 | 65 1.9 | 80 1.9 |

In Table 5, generated electric power where a boost pressure indicated in the longitudinal direction and an exhaust pressure indicated in the horizontal direction are set to give a listed value is shown in an upper row, while a flow rate of steam thereof is shown in a lower row. Based on Table 5, where the boost pressure is to give 0.50 MPa and the exhaust pressure is to give 0.15 MPa, generated electric power is 60 kW and a flow rate of steam is 2.2 t/h. Therefore, the specifications of steam required by the turbine for generating electric power of 60 kW by the use of the turbine are a boost pressure of 0.50 MPa and a flow rate of steam of 2.2 t/h.

Table 6 shows a summary of saturated steam table.

TABLE 6

| Temperature C. ° | Saturation pressure Mpa |
|---|---|
| 150 | 0.4758 |
| 155 | 0.5431 |
| 160 | 0.6178 |
| 165 | 0.7005 |
| 170 | 0.7917 |

With reference to Table 6, production of steam which is 155° C. and 0.5431 MPa will be sufficient for meeting the above-described specifications of the steam required by the turbine.

Based on the evaluations so far made, values of steam, etc., are set as shown in Table 7.

TABLE 7

| | Temperature of steam ° C. | Pressure Mpa | Released pressure Mpa | Target electric power generation kW | Amount of necessary steam t/h | Amount of necessary water T/s |
|---|---|---|---|---|---|---|
| Specifications required by turbine | | 0.5000 | 0.15 | 60 | 2.2 | 0.0006 |
| Values of geothermal heat exchanger | 155.0 | 0.5431 | 0.15 | 60 | 2.2 | 0.0006 |

The above-described setting has one great advantage in that the amount of water necessary for generating electric power is much smaller than the amount of water in case in which it is extracted as pressurized water.

Hereinafter, a description will be given of an embodiment in which water that is supplied to a water injection pipe is pressurized on the ground.

Figure 5:
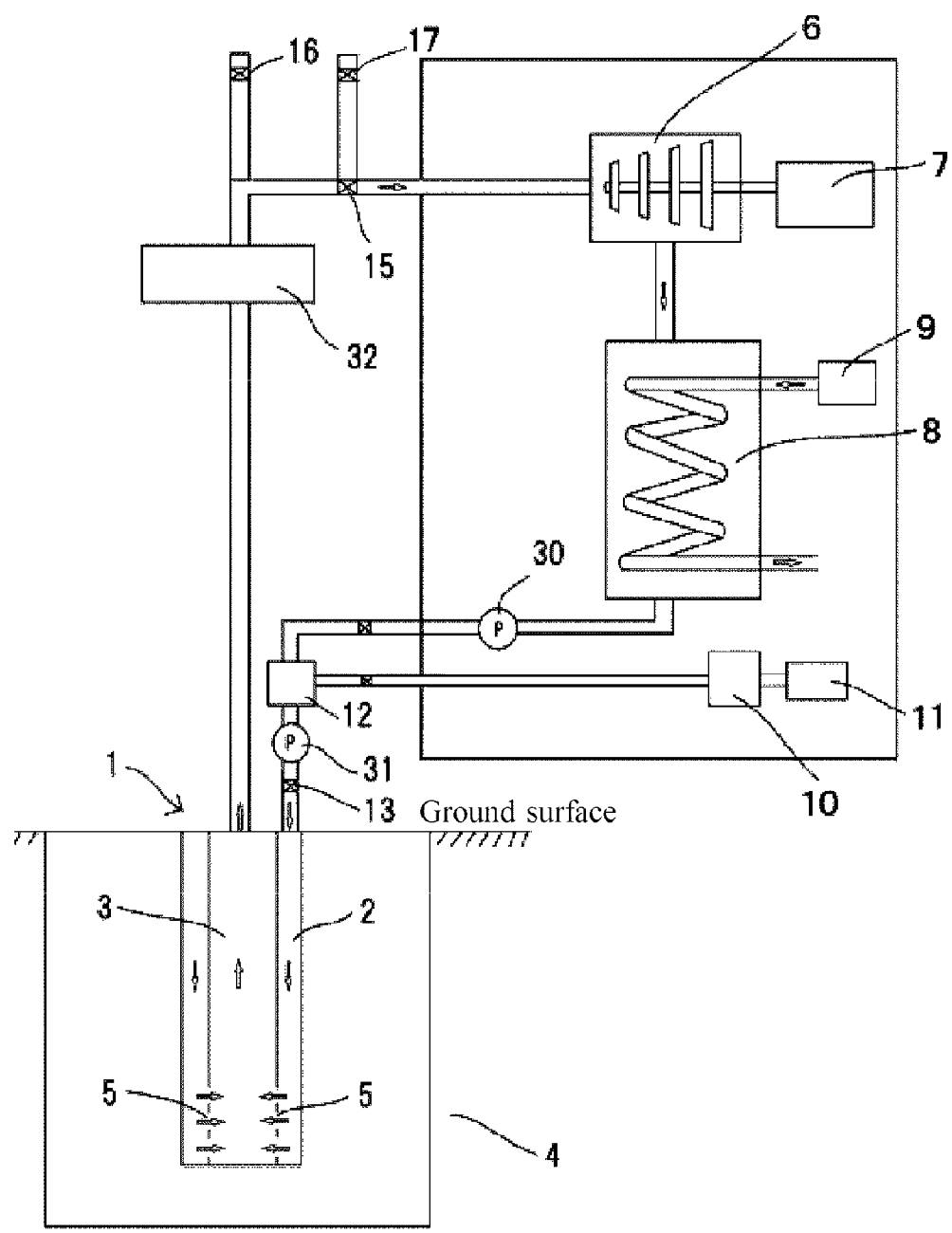
FIG. 5 is a drawing which shows a boiling-water geothermal heat exchanger and boiling-water geothermal power generation equipment according to an embodiment in which water supplied to a water injection pipe is pressurized on the ground.

FIG. 5 shows a boiling-water geothermal heat exchanger and boiling-water geothermal power generation equipment according to the above-described embodiment.

In FIG. 5, a geothermal heat exchanger 1 is provided with a water injection pipe 2 which is installed underground and to which water is supplied from the ground and a steam extraction pipe 3 which is installed underground so as to be in contact with the water injection pipe 2. In FIG. 5, the water injection pipe 2 is given as an outer pipe which is closer to a geothermal region 4, and the steam extraction pipe 3 is given as an inner pipe installed inside the water injection pipe 2, thereby giving a double pipe structure. However, in reverse, the steam extraction pipe 3 may be given as an outer pipe, and the water injection pipe 2 may be given as an inner pipe.

The steam extraction pipe 3 is provided with a plurality of ejection ports 5 at a lower part thereof, and the water injection pipe 2 and the steam extraction pipe 3 are kept open by the ejection ports 5. That is, the ejection ports 5 are installed at a boundary between the water injection pipe 2 and the steam extraction pipe 3. The steam extraction pipe 3 is connected to a turbine 6, and a pressure inside the steam extraction pipe 3 is reduced to the vicinity of a pressure required by the turbine 6.

A pressure pump 31 for pressurizing water which is supplied to the water injection pipe 2 is disposed on the ground. The water supplied to the water injection pipe 2 is pressurized on the ground by the pressure pump 31. Therefore, at a lower part of the water injection pipe 2, pressurized water in which a pressure resulting from this pressurization is added to a pressure substantially proportional to the depth from the ground can be provided.

Heat is supplied to the pressurized water from the geothermal region 4 and the water is turned to high-temperature pressurized water. Since the interior of the steam extraction pipe 3 is reduced in pressure, the high-temperature pressurized water is ejected by the use of the difference in pressure through the ejection ports 5 into the steam extraction pipe 3 in a state of atomization as indicated by the arrows. The water is evaporated by utilizing a difference between a pressure required by the turbine 6 and a pressure at the bottom of the water injection pipe 2 and changed to a single-phase flow of steam. The single-phase flow of steam produced underground moves to the turbine 6 due to a difference between the pressure at the steam extraction pipe 3 and that of the turbine 6 and, thereafter, expands inside the turbine 6, thereby giving power for rotating the turbine 6. Electric power is generated by a generator 7 which is thus powered.

A steam header 32 is used in a case where steam produced at a plurality of geothermal wells is gathered collectively and supplied to a single unit of the turbine 6. Thus, pressures can be made uniform by the use of the steam header 32. In addition, the steam header 32 can be used not only in the present embodiment in which water supplied to the water injection pipe is pressurized on the ground but also in the embodiment shown in FIG. 1 in which no pressure pump is used.

Steam which has come out from the turbine 6 is thereafter cooled with cooling water 9 by a condenser 8, and reverted to water which is again supplied to the water injection pipe 2. Since an amount of circulating water is equal to an amount of steam required by the turbine 6, the amount of circulating water can be decreased to a great extent. The above-described course is repeated to continuously extract geothermal power. Makeup water 11 is supplemented via a water treatment device 10 from a makeup water tank 12, whenever necessary. An extraction pump 30 is installed between the condenser 8 and the makeup water tank 12. The makeup water 11 is adjusted for its level by a makeup water adjusting valve 13. A steam adjusting valve 15 is installed between the steam extraction pipe 3 and the turbine 6. A pressure adjusting valve 17 is also installed.

Figure 6:
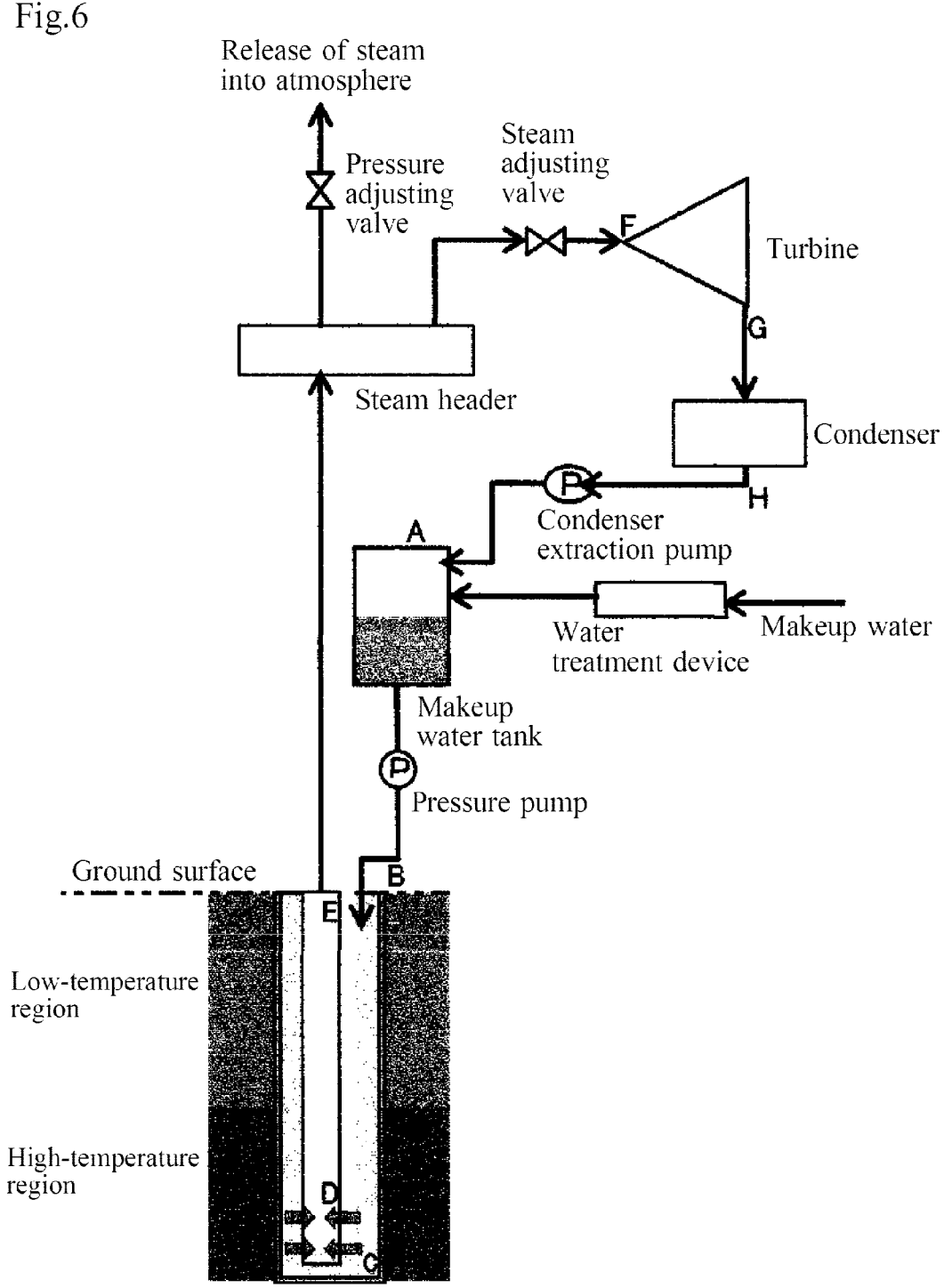
FIG. 6 is a drawing which shows a flow and a pressure gradient of the boiling-water geothermal heat exchanger according to the embodiment in which water supplied to the water injection pipe is pressurized on the ground.

FIG. 6 shows a flow and a pressure gradient of the boiling-water geothermal heat exchanger according to the embodiment in which water supplied to the water injection pipe is pressurized on the ground. Further, pressures given at individual points of A to H in FIG. 6 are shown as a unit of MPa in Table 8. In addition, as will be described later, values shown below are provided under the conditions that at a bore hole in which a temperature at the deepest site of a geothermal region at a depth of 700 m is about 186° C., steam with a temperature of 135° C. is extracted to generate electric power of 1000 kW on a large scale. Individual values are not restricted to the above description and can be set by being changed whenever necessary, depending on the situation of the bore hole and electric power output.

TABLE 8

| Sites | Names | Pressures (MPa) |
|---|---|---|
| A | Makeup water tank | 0.1013 |
| B | Inlet of water injection pipe | 1.1161 |
| C | Bottom of water injection pipe | 7.4841 |
| D | Side of steam extraction pipe | 0.3130 |
| E | Outlet of steam extraction pipe | 0.3130 |
| F | Inlet of turbine | 0.1960 |
| G | Outlet of turbine | 0.0800 |
| H | Outlet of condenser | 0.0127 |

In FIG. 6, a pressure at A point is set to be 0.1013 MPa which is equivalent to an atmospheric pressure. A pressure of water at B point which is the inlet of the water injection pipe pressurized by the pressure pump becomes 1.1161

MPa. This is because the loss of head of the pipe is 0.0148 MPa and 1.0148 MPa which is obtained by adding 1 MPa thereto is given as a pressurized portion. Since 1 MPa is equivalent to a hydraulic pressure at a depth of about 100 m, a pressure equivalent to that at a depth of 100 m is added to a pressure of a bore hole at a depth of 700 m, thereby providing effects that boring is conducted at a depth of about 800 m.

At C point which is the bottom of the water injection pipe, water can be turned to pressurized water to which a pressure substantially proportional to the depth from the ground is added, with the pressure thereof being 7.4841 MPa. The pressurized water receives heat from a high-temperature region. The pressurized water which has been ejected at D point is reduced in pressure and evaporated. A pressure at a part between Point E and the steam header is set at 0.3130 MPa which is slightly higher than a pressure supplied to the turbine. At the start of operation, a steam adjusting valve is used to gradually introduce steam into the turbine. At F point, steam is supplied to the turbine at a pressure of 0.1960 MPa. Upon abrupt elevation of the pressure, the pressure adjusting valve is used to release steam into the atmosphere. Steam which has rotated the turbine is reverted to water by a condenser and the water is sent to a makeup water tank by using a condenser extraction pump. The steam header is used in a case in which steam is gathered collectively from a plurality of steam extraction pipes.

Figure 7:
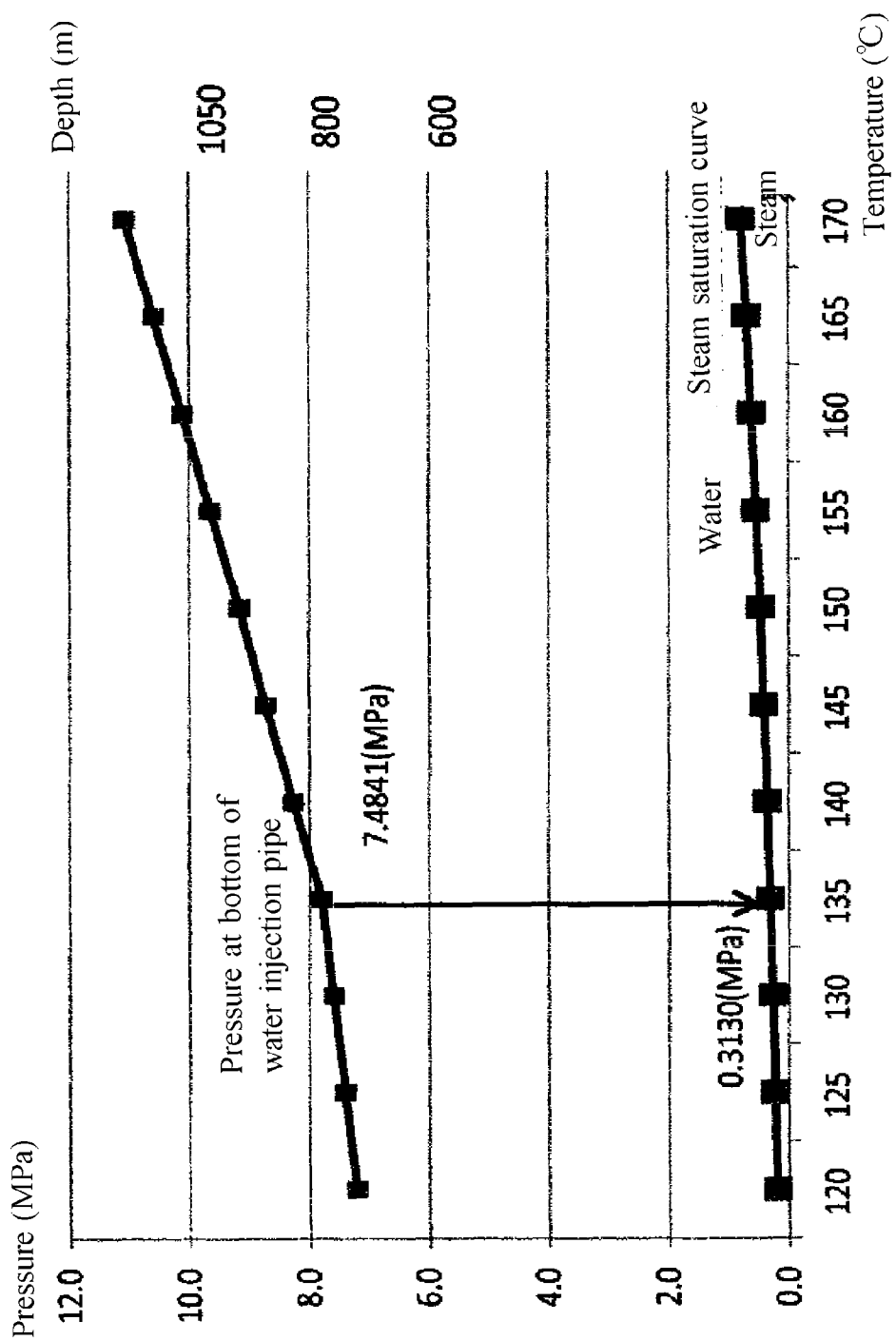
FIG. 7 is a drawing which shows a phase diagram of water and a mechanism of reduction in pressure according to the embodiment in which water supplied to the water injection pipe is pressurized on the ground.

FIG. 7 shows a phase diagram of water and a mechanism of reduction in pressure. In FIG. 7, the horizontal axis denotes a temperature (° C.) and the longitudinal axis denotes a pressure (MPa) which is developed in association with the depth at the bottom of the water injection pipe of the geothermal heat exchanger.

In a region at a depth of 700 m, a pressure of 7.4841 MPa is applied to the bottom of the water injection pipe. This pressure is derived from an atmospheric pressure (0.1013 MPa)+pressurized portion (1.0148 MPa)+a natural hydraulic pressure (6.3828 MPa)−loss of head (0.0148 MPa). At a bore hole in which a temperature in a geothermal region at a depth of 700 m is about 186° C., when high-temperature pressurized water is ejected to the steam extraction pipe from the bottom of the water injection pipe, water is evaporated at a pressure of 0.3130 MPa at 135° C. due to the fact that a pressure inside the steam extraction pipe is about 0.3130 MPa. Thus, the high-temperature pressurized water is evaporated instantly inside the steam extraction pipe. This mechanism is used to produce a single-phase flow of steam inside the steam extraction pipe installed underground and extract the steam on the ground.

Table 9 shows a saturation pressure in the vicinity of 135° C.

TABLE 9

| Temperature ° C. | Saturation pressure Mpa |
|---|---|
| 130 | 0.270 |
| 135 | 0.313 |
| 140 | 0.361 |

Based on the thus listed values, in the present embodiment, a temperature is set at 135° C. and a pressure is set at 0.3130 MPa, with allowance given to a pressure of 0.1960 MPa required by the turbine.

An advantage in having the water to be supplied to the water injection pipe be pressurized on the ground is that on large-scale generation of electric power, an amount of circulating water is increased to result in an increase in loss of head at an outer pipe portion and, therefore, an increased portion of the loss of head is supplemented by pressurization, thus making it possible to obtain a greater pressure than a natural hydraulic pressure. As a result, it is possible to realize large-scale generation of electric power.

Table 10 shows small-scale generation of electric power with a target generated output of 60 kW and large-scale generation of electric power with a target generated output of 1000 kW by comparison. In Table 10, the loss of head is calculated on the conditions that the outer pipe is 0.1652 m in outer diameter and 0.1552 m in inner diameter, the inner pipe is 0.0891 m in outer diameter and 0.0807 m in inner diameter, the pipe length is 700 m and the flow speed is 0.1657 m/s.

TABLE 10

| | Target generation value kW | Temperature of steam ° C. | Pressure of steam MPa | Amount of steam t/h | Amount of necessary water t/h | Loss of head MPa |
|---|---|---|---|---|---|---|
| Small-scale generation | 60 | 150 | 0.476 | 2.2 | 2.2 | 0.0012 |
| Large-scale generation | 1000 | 135 | 0.313 | 7.0 | 7.0 | 0.0148 |

As shown in Table 10, where electric power is to be generated on a large scale, an amount of steam, that is, an amount of necessary water is inevitably increased to result in an increase in loss of head. In order to cope with this problem, it is important that water to be supplied to the water injection pipe is pressurized to supplement the loss of head and a pressure of steam is raised. In the present embodiment, with the above description taken into account, a pressure pump is used to apply pressure. In Table 10, in the large-scale generation of electric power with the target generated output of 1000 kW, an amount of necessary water is 3.2 times greater than an amount of necessary water in the small-scale generation of electric power with the target generated output of 60 kW. Accordingly, the loss of head is increased approximately 10 times. However, this increase is supplemented by pressurization.

Steam used in geothermal power generation in general is lower in pressure than that used in thermal power generation and, accordingly, output is smaller. However, if high-pressure steam can be produced by pressurization, it is possible to realize geothermal power generation on a large scale. Further, in geothermal power generation which has been conventionally conducted and generally accepted, a turbine is larger in size due to a lower pressure of steam. However, an increased pressure of steam by pressurization offers an additional advantage of downsizing a turbine and efficient generation of electric power.

Table 11 shows by comparison numerical values shown in Table 10 and those of conventional geothermal power generation equipment actually in operation.

TABLE 11

| | Rated output MW | Pressure of steam MPa | Temperature of steam ° C. | Flow rate of steam t/h | Flow rate of steam (per MW) t/h/1 MW |
|---|---|---|---|---|---|
| Hatchobaru Power Plant, Kyushu Electric Power Co., Inc. | 55.0 | 0.490 | 158 | 890 | 16.2 |

TABLE 11-continued

|  | Rated output MW | Pressure of steam MPa | Temperature of steam ° C. | Flow rate of steam t/h | Flow rate of steam (per MW) t/h/1 MW |
|---|---|---|---|---|---|
| Kuju Kanko Hotel | 2.0 | 0.196 | 133 | 14 | 7.0 |
| Present embodiment | 1.0 | 0.313 | 135 | 7.0 | 7.0 |

At Hatchobaru Power Plant of Kyushu Electric Power Co., Inc. and Kuju Kanko Hotel, geothermal power generation is a conventional process in which natural hot water present underground is utilized. In Table 11, comparison was made in terms of 1 MW due to the fact that Hatchobaru Power Plant of Kyushu Electric Power Co., Inc. is significantly different in rated output. Although the number of bore holes and the depth of each bore hole are different from conditions of calculation used in the present embodiment, a pressure of steam, a temperature of steam, and a flow rate of steam are numerical values which can be sufficiently achieved by a method of the present embodiment.

As described above, highly treated water is fed into the underground deepest site by using a pressure pump and utilizing a natural pressure, by which a pressure gradient is formed at the lower part of the water injection pipe and the upper part of the water injection pipe. A pressure at the upper part of the water injection pipe is an inlet pressure required by the turbine. Pressure loss occurring inside the water injection pipe and in piping is a value which is lower by one order. Therefore, in principle, the depth of a bore hole is justified by such a depth that can provide a portion of pressure required by the turbine. Pressurization is done by using a pressure pump, thus making it possible to realize the use of a high-temperature geothermal region and application to geothermal power generation on a large scale.

Figure 8:
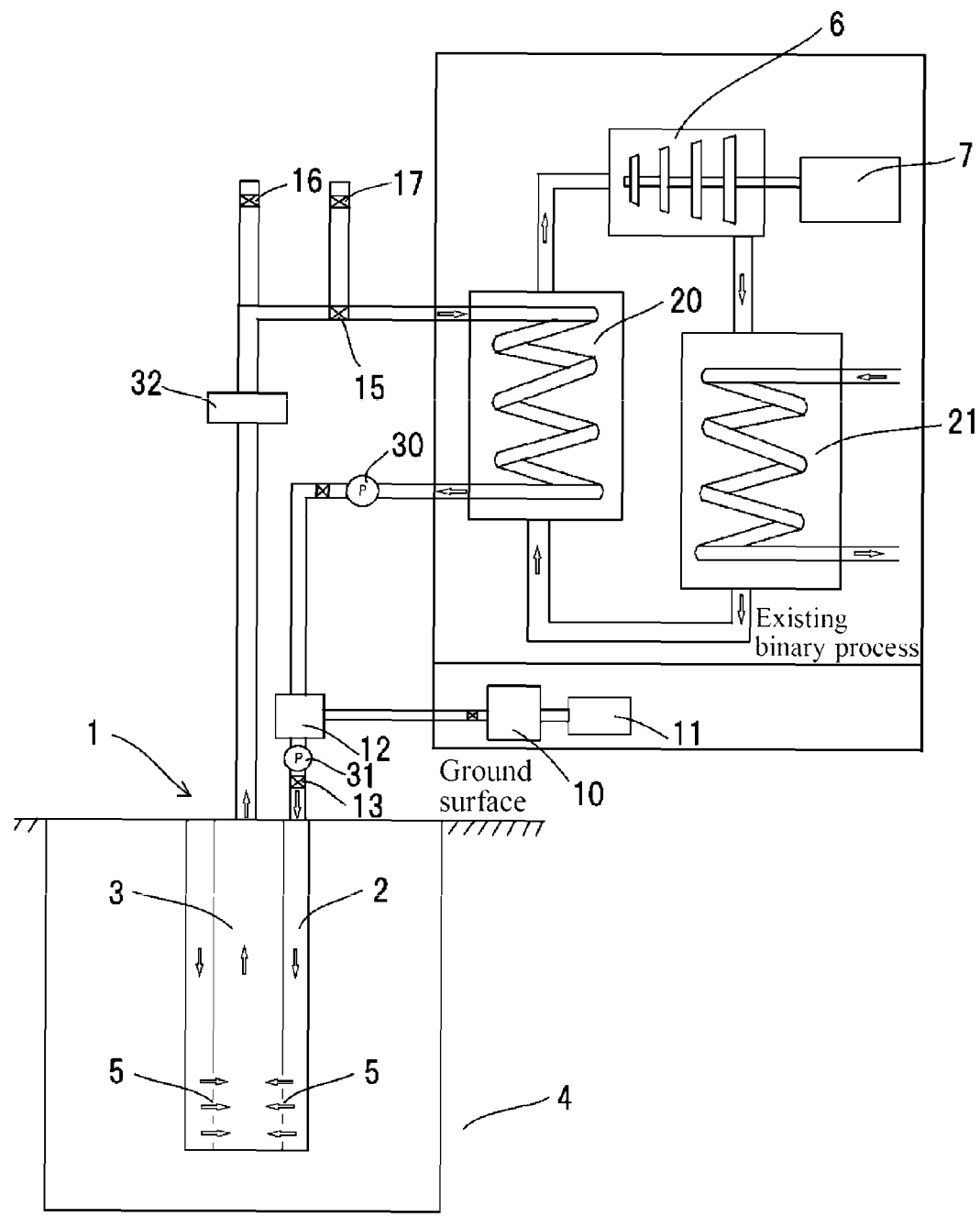
FIG. 8 is a drawing which shows an arrangement of boiling-water geothermal power generation equipment that uses a type of boiling-water geothermal heat exchanger in which water supplied to a water injection pipe is pressurized on the ground for generation of electric power based on a binary process.

FIG. 8 shows an arrangement of boiling-water geothermal power generation equipment that uses a type of boiling-water geothermal heat exchanger in which water to be supplied to a water injection pipe is pressurized on the ground for generation of electric power based on a binary process.

In FIG. 8, a geothermal heat exchanger 1 is similar in functions to that described with reference to FIG. 5 in which a pressure pump 31 for pressurizing water to be supplied to a water injection pipe 2 is disposed on the ground. Water which is supplied to the water injection pipe 2 is pressurized on the ground by the pressure pump 31. Therefore, at a lower part of the water injection pipe 2, pressurized water in which a pressure resulting from this pressurization is added to a pressure substantially proportional to the depth from the ground can be provided.

A single-phase flow of steam which has been extracted from a steam extraction pipe 3 of the geothermal heat exchanger 1 is sent to an evaporator 20 to heat a low-boiling point medium. The thus heated low-boiling point medium is turned to steam of low-boiling point medium and the steam moves to a turbine 6, thereby giving power for rotating the turbine 6. Electric power is generated by a generator 7 which is thus powered.

The low-boiling point medium steam which has come out from the turbine 6 is thereafter cooled with cooling water by a cooling condenser 21, and reverted to the low-boiling point medium, and the medium is sent to the evaporator 20. The above-described course is repeated to continuously generate electric power. Makeup water 11 is supplemented via a water treatment device 10 from a makeup water tank 12, whenever necessary. The makeup water 11 is adjusted for its level by a makeup water adjusting valve 13. A steam adjusting valve 15 is installed between the steam extraction pipe 3 and the turbine 6.

FIG. 9 shows a geothermal heat exchanger in which a plurality of water injection pipes are disposed in a circumferential direction of a steam extraction pipe. FIG. 9 (a) is a plan view thereof, and FIG. 9 (b) is a front view thereof.

FIG. 9 shows a case in which in a geothermal heat exchanger 1, a water injection pipe 2 is disposed outside a steam extraction pipe 3. The plurality of water injection pipes 2 are disposed along an outer circumference of the steam extraction pipe 3 in a circumferential direction of the steam extraction pipe 3. The steam extraction pipe 3 is provided at a lower part thereof with a plurality of ejection ports 5. A bottom layer portion 33 of the water injection pipe 2 and the steam extraction pipe 3 are kept open by the ejection ports 5. That is, the ejection ports 5 are installed at a boundary between the bottom layer portion 33 of the water injection pipe 2 and the steam extraction pipe 3. An arrangement is made such that water injected into each of the water injection pipes 2 flows into the bottom layer portion 33 installed below the steam extraction pipe 3, and heat is supplied from a geothermal region 4 to produce high-temperature pressurized water which is ejected via the ejection ports 5 into the steam extraction pipe 3 in a state of atomization.

The steam extraction pipe 3 is connected to a turbine and a pressure inside the steam extraction pipe 3 is reduced to the vicinity of a pressure which is required by the turbine. Design values can be set as follows, for example: the eight water injection pipes 2 (outer pipes) are provided, each of which is 42.7 mm in outer diameter (35.7 mm in inner diameter), the steam extraction pipe 3 (inner pipe) is 89.1 mm in outer diameter (80.7 mm in inner diameter), and these water injection pipes 2 and the steam extraction pipe 3 are assembled to give a final entire diameter of 200 mm. It is also possible that a depth of the steam extraction pipe 3 is 950 m and a vertical dimension of the bottom layer portion 33 of the water injection pipe 2 is 500 mm.

Water supplied to the water injection pipe 2 by utilizing a natural fall in water level or water pressurized by a pressure pump installed on the ground is given at the bottom layer portion 33 of the water injection pipe 2 a pressure which is substantially proportional to the depth from the ground and turned to high-temperature pressurized water by heat supplied from a geothermal region 4. The interior of the steam extraction pipe 3 is reduced in pressure and, therefore, this difference in pressure is utilized to eject the high-temperature pressurized water into the steam extraction pipe 3 from the ejection ports 5 in a state of atomization. The high-temperature pressurized water is evaporated by utilizing a difference between a pressure required by the turbine and a pressure at the bottom layer portion 33 of the water injection pipe 2 and changed to a single-phase flow of steam. The single-phase flow of steam produced underground moves to the turbine due to a difference in pressure between the steam extraction pipe 3 and the turbine and, thereafter, expands inside the turbine, thereby giving power for rotating the turbine. Electric power is generated by a generator which is thus powered.

The ejection ports 5 are installed at a boundary between the bottom layer portion 33 of the water injection pipe 2 and the steam extraction pipe 3. This is because where the plurality of water injection pipes 2 are disposed along the outside of the steam extraction pipe 3 in the circumferential direction, the water injection pipes 2 are in contact with the steam extraction pipe 3 at an extremely quite narrow area. Therefore, it is difficult to install a great number of the ejection ports 5 at a boundary between the water injection pipe 2 and the steam extraction pipe 3.

For the convenience of construction, the water injection pipe 2 is buried while pipes, each of which is about 10 m in length, are coupled in a vertical direction, and the pipes are coupled by the use of couplings 34. Therefore, the couplings 34 are structurally attached on the outer circumference of the water injection pipe 2 which has been completed, with intervals kept in the vertical direction.

Cementing 36 is provided on the outer circumference of the water injection pipe 2 near the ground surface so as to form a void portion 35. This is because the vicinity of the ground surface is lower in temperature than an underground region and, therefore, for the purpose of preventing water injected into the water injection pipe 2 from being cooled at this region, air high in heat insulation is used to cover an outer-circumferential part of the water injection pipe 2 near the ground surface.

As described so far, where the plurality of water injection pipes 2 are disposed in the circumferential direction of the steam extraction pipe 3, a heat transfer surface area in which heat is transmitted from a geothermal region is increased approximately twice than a case where the water injection pipe 2 is provided as a single pipe. As a result, heat conduction performance is improved to contribute to reduction in construction costs. The water injection pipe 2 may be formed with a material high in thermal conductivity or formed by being plated with a material excellent in heat conductivity in order to raise the heat conduction performance from a geothermal region.

As described above, in the present invention, shown are the embodiment in which water is supplied to the water injection pipe by utilizing a natural fall in water level and the embodiment in which water to be supplied to the water injection pipe is pressurized on the ground. Each of the embodiments is clearly characterized by such an arrangement that high-temperature pressurized water is ejected into the steam extraction pipe which is installed underground and reduced in pressure and changed to a single-phase flow of steam exclusively composed of steam inside the underground steam extraction pipe. This offers a great advantage.

INDUSTRIAL APPLICABILITY

The present invention is applicable in a wide variety of uses as a boiling-water geothermal heat exchanger excellent in heat exchange efficiency which is able to suppress occurrence of pressure loss and heat loss in piping, decrease the diameter of a pipe buried underground and reduce an amount of circulating water and also as boiling-water geothermal power generation equipment. In particular, the present invention is remarkably advantageous in that existing bore holes are effectively used and environmental burden can be alleviated in building facilities for generating electric power. With consideration given to the present situation that energy policies of Japan which were heavily dependent on nuclear power generation are obliged to be reviewed fundamentally due to nuclear accidents at power plants, the present invention will certainly make a great contribution to industrial utilization.

DESCRIPTION OF REFERENCE NUMERALS

1 Boiling-water geothermal heat exchanger
2 Water injection pipe
3 Steam extraction pipe
4 Geothermal region
5 Ejection port
6 Turbine
7 Boiling-water geothermal power generation equipment
31 Pressure pump
32 Steam header
33 Bottom layer portion

What is claimed is:
1. A boiling-water geothermal heat exchanger comprising:
a water injection pipe which is installed underground and to which water is supplied from the ground; and
a steam extraction pipe which is installed underground so as to be in contact with the water injection pipe and has a plurality of ejection ports,
in which a pressure inside the steam extraction pipe is reduced to the vicinity of a pressure required by a turbine, high-pressure hot water which is produced by supplying heat from a geothermal region to water inside the water injection pipe is changed to a single-phase flow of steam inside the steam extraction pipe present underground via the ejection ports, and the single-phase flow of steam is extracted on the ground, and
in which a heat insulation portion is formed at a part which is in contact with a low-temperature region close to the ground surface and the heat insulation portion is such that the level of water supplied to the water injection pipe is lowered to form an air layer at an upper part of the water injection pipe.

2. The boiling-water geothermal heat exchanger according to claim 1, wherein a pressure pump for pressurizing the water to be supplied to the water injection pipe is disposed on the ground.

3. The boiling-water geothermal heat exchanger according to claim 1, wherein
where the water injection pipe is disposed outside the steam extraction pipe, a structure is provided such that the plurality of water injection pipes are disposed along an outer circumference of the steam extraction pipe in a circumferential direction of the steam extraction pipe and water injected into each of the water injection pipes flows into a bottom layer portion installed below the steam extraction pipe, and an ejection port is installed at a boundary between the bottom layer portion of the water injection pipe and the steam extraction pipe.

4. The boiling-water geothermal heat exchanger according to claim 1, wherein
an insertion pipe which is formed as a combination of at least the one water injection pipe and at least the one steam extraction pipe is arranged so as to be inserted into a plurality of geothermal wells, outlets of the steam extraction pipes are connected in parallel to collect steam obtained from each of the geothermal wells in an aggregate manner, and there is installed a steam header which makes pressures of the thus collected steam uniform.

5. The boiling-water geothermal heat exchanger according to claim 4, wherein
the geothermal well is attached to existing facilities.

6. Boiling-water geothermal power generation equipment, wherein electric power is generated by using the boiling-water geothermal heat exchanger according claim 1.

7. The boiling-water geothermal power generation equipment according to claim 6, wherein the electric power generation is based on a binary process.

\* \* \* \* \*